United States Patent
Girouard et al.

(10) Patent No.: US 11,326,704 B2
(45) Date of Patent: May 10, 2022

(54) CROSS-ACTIVATED PRESSURE RELIEF APPARATUS

(71) Applicant: Emcara Gas Development Inc., Guelph (CA)

(72) Inventors: Erick Girouard, Guelph (CA); Amir Ahmadzadegan, Waterloo (CA)

(73) Assignee: Emcara Gas Development Inc., Guelph (CA)

(*) Notice: Subject to any disclaimer, the term of this patent is extended or adjusted under 35 U.S.C. 154(b) by 50 days.

(21) Appl. No.: 16/622,726

(22) PCT Filed: Jun. 13, 2018

(86) PCT No.: PCT/CA2018/050708
§ 371 (c)(1),
(2) Date: Dec. 13, 2019

(87) PCT Pub. No.: WO2018/227287
PCT Pub. Date: Dec. 20, 2018

(65) Prior Publication Data
US 2020/0103041 A1    Apr. 2, 2020

Related U.S. Application Data

(60) Provisional application No. 62/518,670, filed on Jun. 13, 2017.

(51) Int. Cl.
*F16K 17/10* (2006.01)
*F16K 17/00* (2006.01)
(Continued)

(52) U.S. Cl.
CPC ........... *F16K 17/003* (2013.01); *F16K 17/38* (2013.01); *F16K 31/002* (2013.01);
(Continued)

(58) Field of Classification Search
CPC ...... F16K 17/003; F16K 17/38; F16K 31/002; F16K 31/003; F17C 13/04; F17C 2205/0332
(Continued)

(56) References Cited

U.S. PATENT DOCUMENTS 2,377,132 A * 5/1945 Crowe ............... G05D 23/025
236/92 C
2,444,130 A * 6/1948 Crowe ............... F16K 17/003
236/92 C
(Continued)

OTHER PUBLICATIONS

Extended European Search Report issued in EP18818063.2, dated Jan. 29, 2021.
(Continued)

*Primary Examiner* — Minh Q Le
(74) *Attorney, Agent, or Firm* — Ridout & Maybee LLP

(57) ABSTRACT

A pressure relief apparatus for venting a tank comprising an inlet port, an outlet port, a closure member retained, relative to the inlet and outlet ports, for preventing, or substantially preventing, fluid communication between the inlet port and the outlet port, a trigger mechanism including a temperature response portion, and a compartment for receiving pressurized fluid from the outlet port and communicating the received pressurized fluid to the trigger mechanism. The trigger mechanism and the closure member are cooperatively configured to release the closure member and establish fluid communication between the inlet port and the outlet port, thereby venting the tank, upon detection of a temperature at or above a predetermined temperature threshold or upon pressurization of the compartment at or above a predetermined pressure threshold.

23 Claims, 6 Drawing Sheets

(51) Int. Cl.
*F16K 17/38* (2006.01)
*F16K 31/00* (2006.01)
*F17C 13/04* (2006.01)

(52) U.S. Cl.
CPC ............ *F16K 31/003* (2013.01); *F17C 13/04* (2013.01); *F17C 2205/0332* (2013.01)

(58) Field of Classification Search
USPC ...... 137/14, 73, 115.23, 461, 468, 488, 490; 251/11, 66
See application file for complete search history.

(56) References Cited

U.S. PATENT DOCUMENTS

| | | | | |
|---|---|---|---|---|
| 2,570,432 | A * | 10/1951 | Dillon | F16K 17/003 236/92 C |
| 2,868,460 | A * | 1/1959 | Hansen | F16K 17/003 236/92 C |
| 3,140,721 | A * | 7/1964 | Sullivan | F16K 17/003 137/73 |
| 3,289,686 | A * | 12/1966 | Tyer, Jr. | F16K 17/003 137/73 |
| 4,064,890 | A * | 12/1977 | Collins | G05D 16/0666 137/73 |
| 4,224,994 | A * | 9/1980 | Tone | A62C 13/70 169/88 |
| 5,788,212 | A * | 8/1998 | Hackman | F16K 17/38 251/11 |
| 6,269,830 | B1 * | 8/2001 | Ingle | F16K 31/002 137/79 |
| 7,971,798 | B2 * | 7/2011 | Pechtold | G05D 23/125 236/100 |
| 9,121,521 | B2 | 1/2015 | Girouard | |
| 2012/0199764 | A1 * | 8/2012 | Girouard | F16K 31/002 251/11 |
| 2014/0326334 | A1 * | 11/2014 | Girouard | F16K 17/38 137/468 |
| 2016/0215894 | A1 | 7/2016 | Girouard | |
| 2019/0250650 | A1 * | 8/2019 | Hawkins | F17C 13/12 |

OTHER PUBLICATIONS

International Search Report and Written Opinion issued in PCT application PCT/CA2018/050708, dated Sep. 10, 2018.
International Preliminary Report on Patentability issued in PCT application PCT/CA2018/050708, dated Dec. 26, 2019.

* cited by examiner

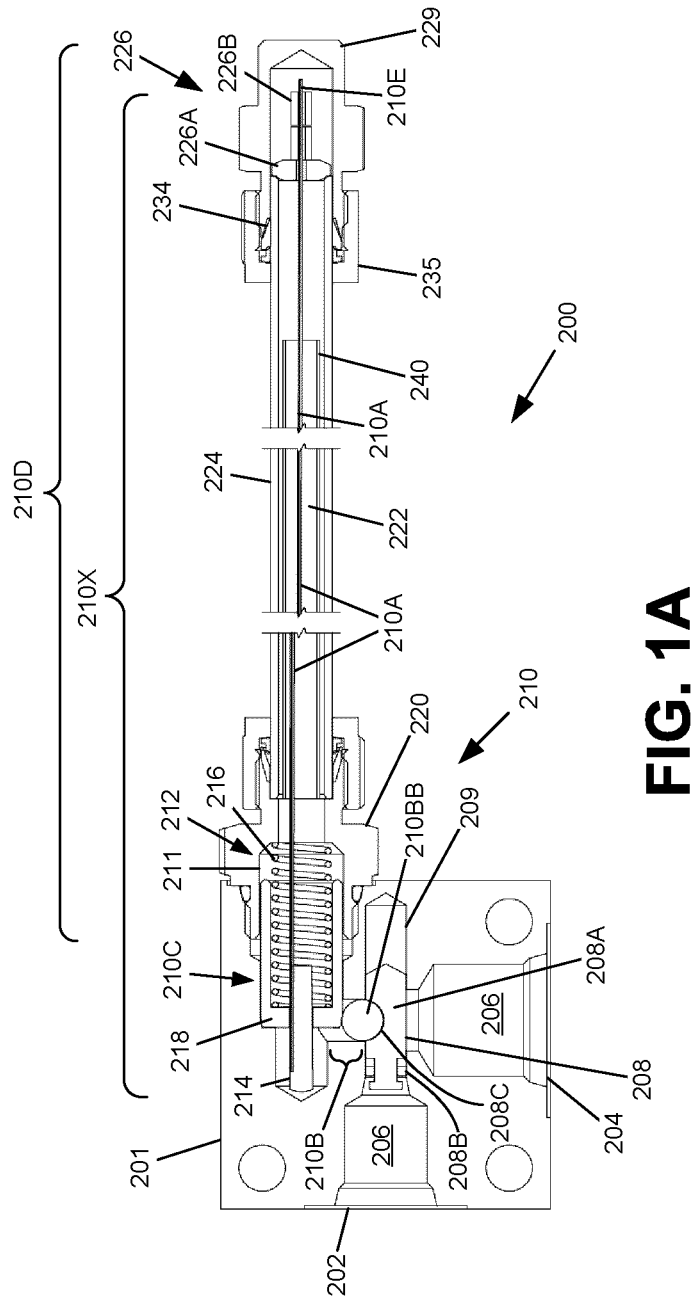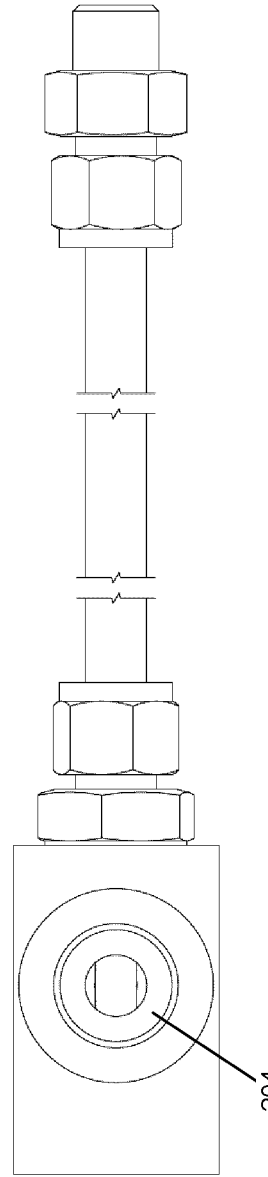

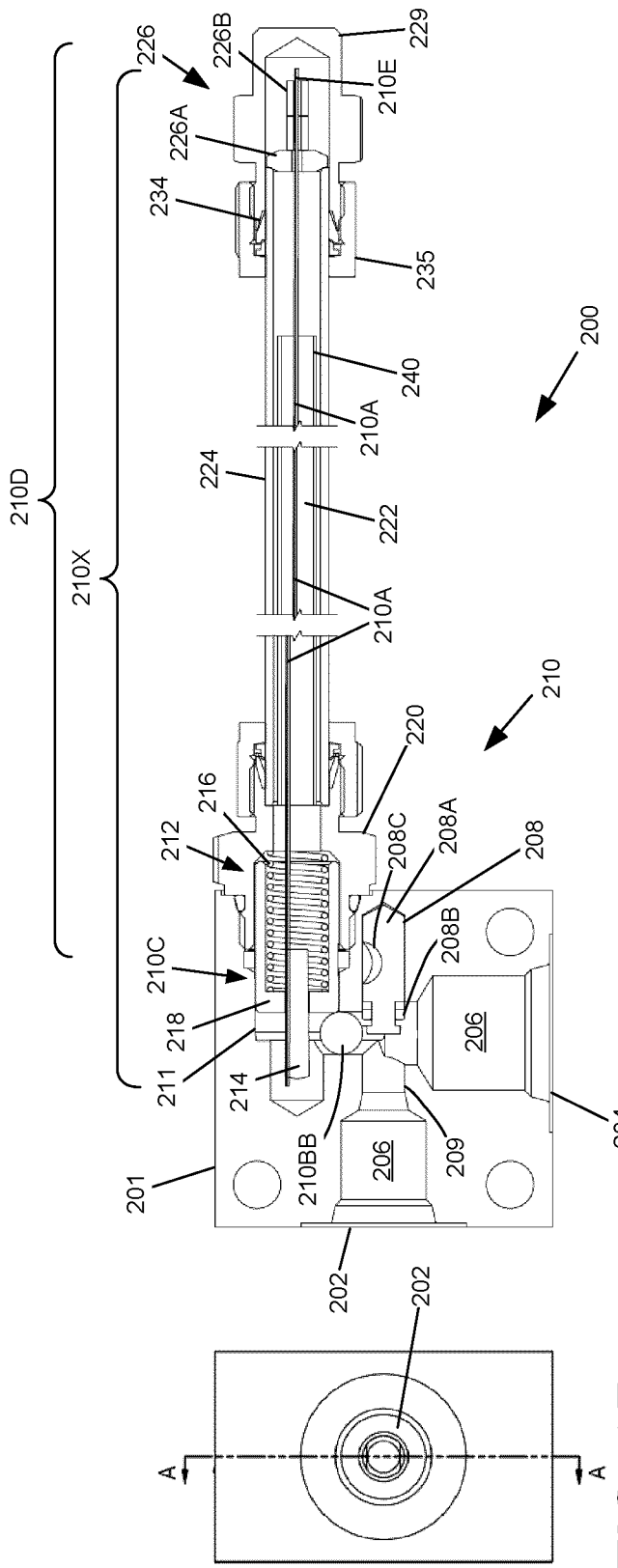
FIG. 2A
FIG. 2B
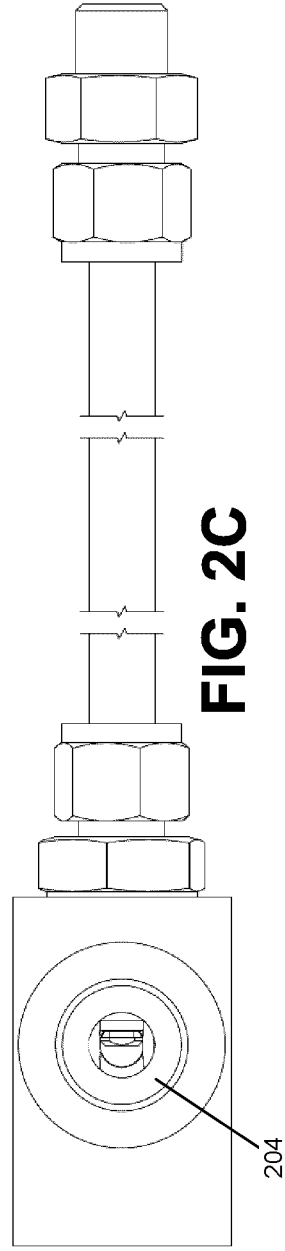
FIG. 2C

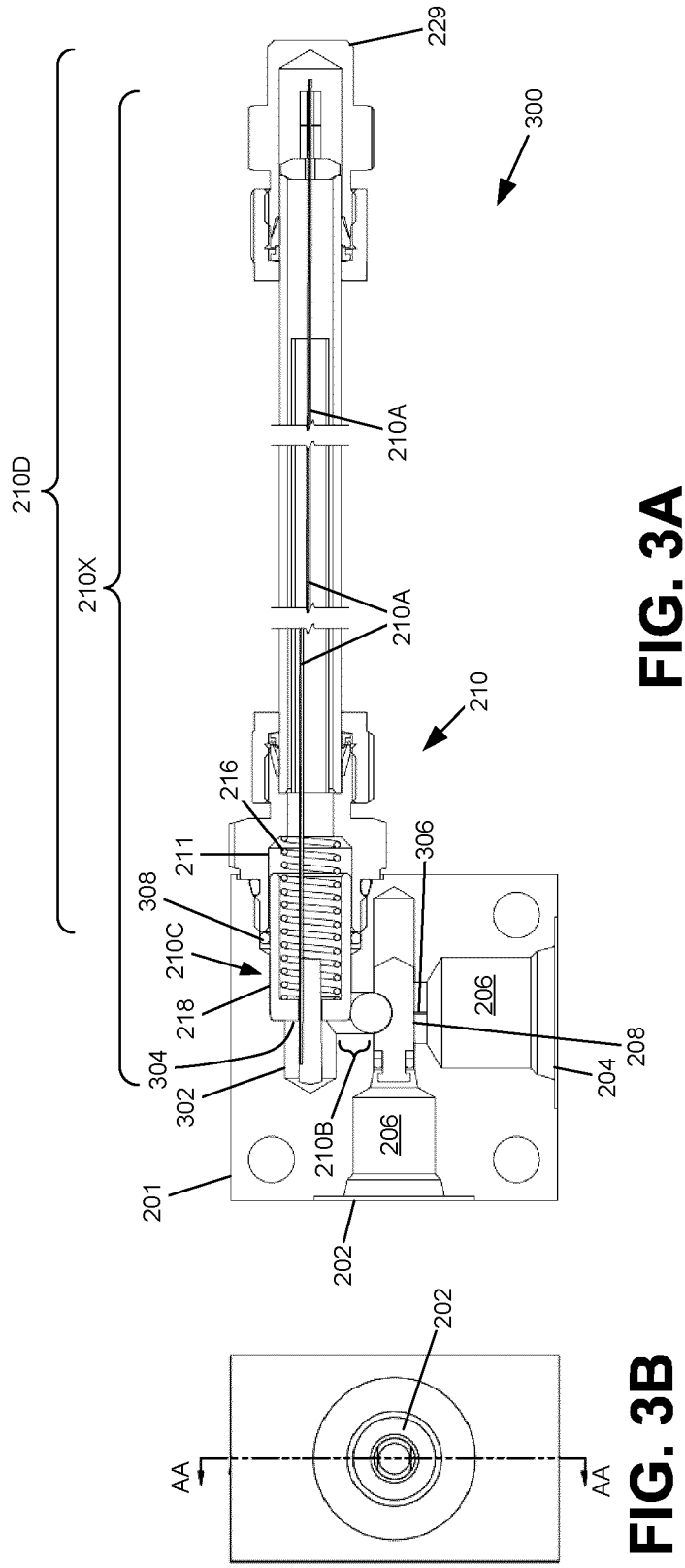
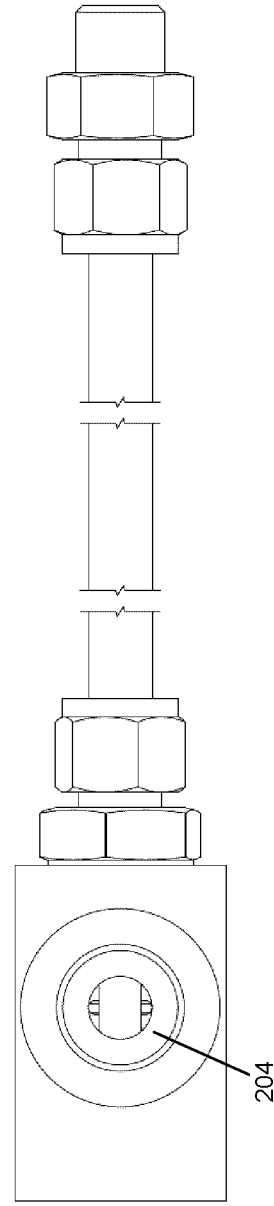
FIG. 3A
FIG. 3B
FIG. 3C

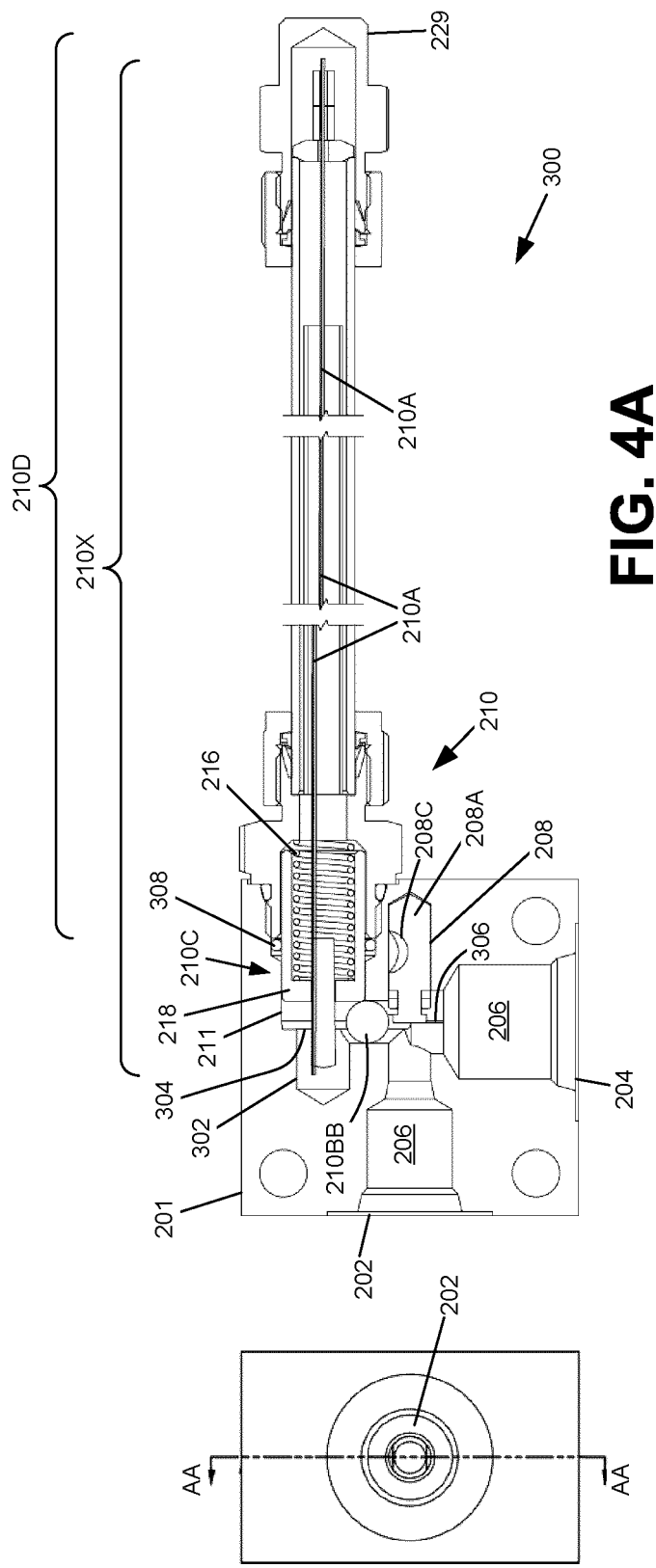
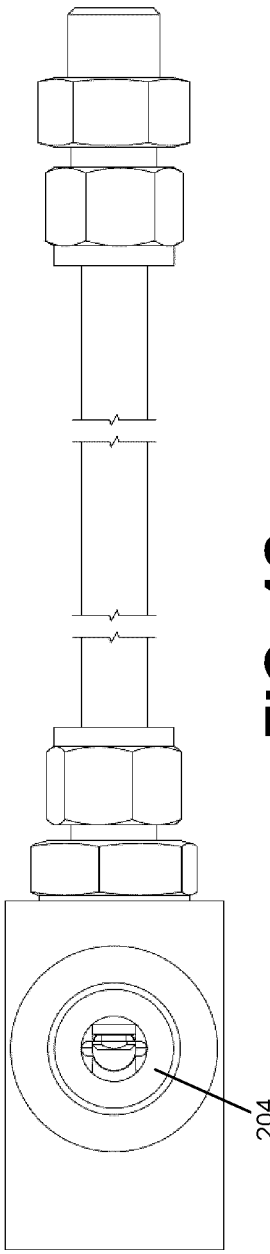
FIG. 4A
FIG. 4B
FIG. 4C

CROSS-ACTIVATED PRESSURE RELIEF APPARATUS

CROSS-REFERENCE TO RELATED APPLICATION

This application claims benefit of and priority to U.S. Provisional Patent Application No. 62/518,670 filed Jun. 13, 2017, the contents of which are incorporated herein by reference.

FIELD

This relates to the field of relief devices, and in particular, to a pressure relief apparatus that vents a tank upon detection of a temperature at or above a temperature threshold or in response to pressurization of a compartment of the pressure relief apparatus at or above a predetermined pressure threshold.

BACKGROUND

Pressurized fluids are typically stored in pressure vessels. These vessels may be constructed of materials that can withstand the internal pressure of the vessel, but may degrade if exposed to external elements, such as a fire. If exposed to a fire, the pressure inside the vessel may increase, while the material of the vessel may weaken, causing the vessel to rupture and exposing the pressurized fluids to the fire.

A relief device may be installed on a vessel to mitigate rupture. The relief device may detect a relief condition, such as temperature, at or above a threshold. Upon detection of the relief condition, the relief device may vent the tank in a controlled manner before the tank ruptures. The relief device may empty the vessel faster than the vessel's degradation so the vessel may be safely vented.

To increase storage capacity, multiple pressure vessels may be connected together in fluid communication. In such a multi-vessel system, a plurality of relief devices may be installed, for example, one relief device on each vessel, to safely vent the pressurized fluid. However, the external element, such as the fire, may only affect one vessel, or may affect one vessel for an extended period of time before affecting the other vessels. In such a situation, the relief device of that one vessel may activate and vent the vessel. However, because the vessels are in fluid communication, the pressurized fluid of the unaffected vessels may flow into the affected vessel, essentially refilling the affected vessel while it is being vented. This may increase the amount of time required to vent the vessel, or the vessel may be refilled faster than it is being vented, resulting in vessel rupture and exposure of the pressurized fluid to the fire.

One way to protect multi-vessel systems may be to use multiple relief devices to activate a single valve, such as a piloted valve. Unfortunately, this configuration may not be effective with smaller vessels. Further, it may require connections between the vessels and the single valve that must be kept free of impediments, which may not be practical.

SUMMARY

In one aspect, there is provided an example pressure relief apparatus for venting a tank comprising: an inlet port, an outlet port, a closure member retained, relative to the inlet and outlet ports, for preventing, or substantially preventing, fluid communication between the inlet port and the outlet port, a trigger mechanism including a temperature response portion, and a compartment for receiving pressurized fluid from the outlet port and communicating the received pressurized fluid to the trigger mechanism. The trigger mechanism and the closure member are cooperatively configured such that the closure member becomes released from retention and moveable for effecting establishment of fluid communication between the inlet port and the outlet port in response to receiving of heat energy by the temperature responsive portion. Further, the trigger mechanism, the closure member, and the compartment are cooperatively configured such that the closure member becomes released from retention and moveable for effecting establishment of fluid communication between the inlet port and the outlet port in response to the communication of the pressurized fluid to the trigger mechanism via the compartment.

In another aspect, there is provided an example method of controlling pressure in a tank comprising: receiving a flow of pressurized fluid from an external pressurized fluid source into a compartment defined in a pressure relief apparatus of a tank, and opening the pressure relief apparatus in response to the receiving of the flow of pressurized fluid such that the tank is vented.

In another aspect, there is provided an example vent system for controlling pressure of a pressurized system, the pressurized system comprising a first tank and a second tank, the vent system comprising: the first tank in fluid communication with a first relief apparatus, the first relief apparatus comprising an inlet port and an outlet port, and the second tank in fluid communication with a second relief apparatus, the second relief apparatus comprising an inlet port and an outlet port, the outlet port of the first relief apparatus in fluid communication with the outlet port of the second relief apparatus. The second relief apparatus is configured to be triggered for venting the second tank in response to receiving gaseous material vented from the first tank. Other aspects will be apparent from the description and drawings provided herein.

BRIEF DESCRIPTION OF DRAWINGS

In the figures which illustrate example embodiments,

FIG. 1A is a cross-sectional view of a pressure relief apparatus in a closed condition, along line A-A shown in FIG. 1B;

FIG. 1B is a side view of the pressure relief apparatus of FIG. 1A, depicting an inlet;

FIG. 1C is a bottom view of the pressure relief apparatus of FIG. 1A, depicting an outlet;

FIG. 2A is a cross-sectional view of the pressure relief apparatus of FIG. 1A in an open condition;

FIG. 2B is a side view of the pressure relief apparatus of FIG. 2A, depicting an inlet;

FIG. 2C is a bottom view of the pressure relief apparatus of FIG. 2A, depicting an outlet;

FIG. 3A is a cross-sectional view of another pressure relief apparatus in a closed condition, along line AA-AA shown in FIG. 3B;

FIG. 3B is a side view of the pressure relief apparatus of FIG. 3A, depicting an inlet;

FIG. 3C is a bottom view of the pressure relief apparatus of FIG. 3A, depicting an outlet;

FIG. 4A is a cross-sectional view of the pressure relief apparatus of FIG. 3A in an open condition;

FIG. 4B is a side view of the pressure relief apparatus of FIG. 4A, depicting an inlet;

FIG. 4C is a bottom view of the pressure relief apparatus of FIG. 4A, depicting an outlet;

DETAILED DESCRIPTION

Figure 5:
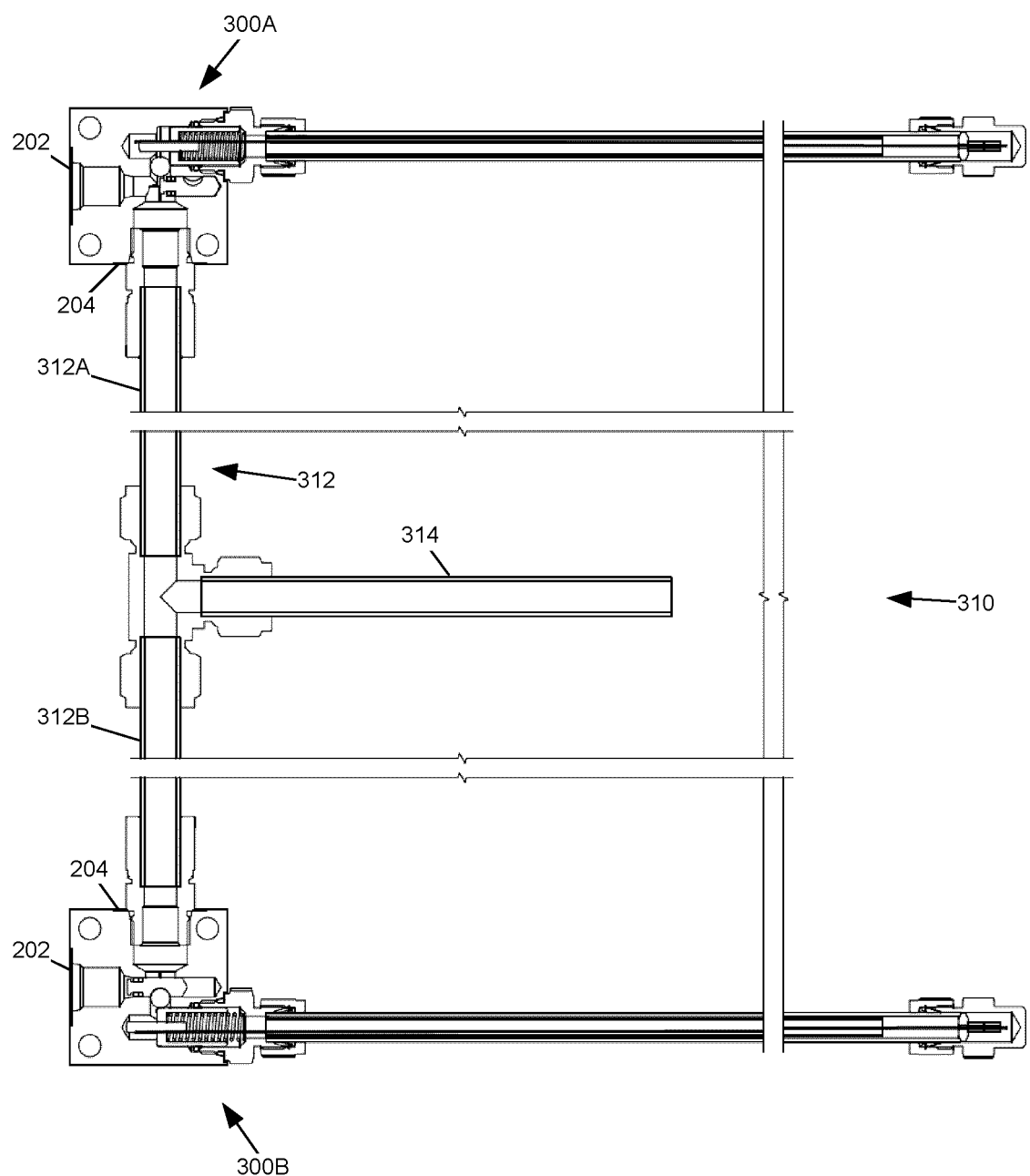
FIG. 5 is a cross-sectional view of a vent system comprising two pressure relief apparatuses of FIG. 3A.

A pressure relief apparatus for venting a tank, a method for controlling pressure in a tank, and a vent system for controlling pressure of a pressurized system are disclosed. The pressure relief apparatus can be triggered to vent the tank either upon detection of a temperature at or above a predetermined temperature threshold, or upon pressurization of a compartment at or above a predetermined pressure threshold. The pressure of a tank can be controlled by receiving a flow of pressurized fluid from an external pressurized fluid source into the compartment defined in the pressure relief apparatus of a tank, and opening the pressure relief apparatus in response receiving the flow of pressurized fluid such that the tank is vented. The vent system comprises a first and second tank, each in fluid communication with a relief apparatus. The outlet port of the relief apparatuses are in fluid communication, and one of the relief apparatuses is configured to be triggered for venting in response to venting by the other relief apparatus.

FIGS. 1A, 1B, and 1C depict an example pressure relief apparatus 200, which, in some embodiments, is used to vent a tank. The pressure relief apparatus 200 depicted in FIGS. 1A, 1B, and 1C is in closed position.

The pressure relief apparatus 200 includes a body 201. The body 201 defines an inlet port 202, an outlet port 204, a fluid passage 206, and a receiving passage 209. The inlet port 202 is configured to be in fluid communication to a tank 100 (not depicted) for receiving the contents from the tank 100. In some embodiments, the contents of the tank 100 are pressurized, such as a pressurized gaseous material. The outlet port 204 is configured for venting the received contents to the immediate environment (for example, the atmosphere). In some embodiments, the material of the body 201 is metallic. Suitable metallic materials include brass, aluminum, or stainless steel, or a combination of these materials.

The pressure relief apparatus 200 further includes a closure member 208 interposed between the inlet port 202 and the outlet port 204, such that when the closure member 208 is in the closed position, fluid communication between the inlet port 202 and the outlet port 204 is sealed or substantially sealed, and in the open position, fluid communication is effected between the inlet port 202 and the outlet port 204.

The closure member 208 is retained, relative to the inlet port 202 and the outlet port 204, for preventing fluid communication between the inlet port 202 and the outlet port 204. The closure member 208 is moveable between a closed position and an open position within the receiving passage 209. The discharge fluid passage 206 extends from the inlet port 202 to the outlet port 204 for effecting fluid communication between the inlet and outlet ports 202, 204, when the closure member 208 is disposed in the open position.

In some embodiments, for example, the closure member 208 includes a closure member body 208A, which carries an O-ring 208B for effecting sealing engagement of the closure member 208 to the body 201, such that fluid is prevented from flowing from the inlet port 202 to the outlet port 204 while the closure member 208 is disposed in the closed position. The closure member body 208A is made from one or more of a variety of materials including metal. For example, a suitable material is steel. As another example, the O-ring 208B is made from elastomeric material.

The pressure relief apparatus 200 further includes a trigger mechanism 210 configured to release the closure member 208 in response to detection of a relief condition. The trigger mechanism 210 is provided for effecting a change in condition to the closure member 208, in response to receiving of a relief condition, such that the closure member 208 becomes displaceable from the closed position to the open position. The trigger mechanism 210 is disposable from a non-actuating position to an actuating position, in response to the relief condition, with effect that the closure member 208 becomes displaceable for effecting fluid communication between the inlet and the outlet ports 202, 204. In some embodiments, for example, the relief condition is a temperature at or above a predetermined temperature threshold, such that the pressure relief apparatus 200 is a thermally actuated pressure relief apparatus. Exemplary thermally actuated pressure relief apparatuses are described and illustrated in U.S. Pat. Nos. 9,121,521 and 9,097,358.

In some embodiments, for example, the trigger mechanism comprises a sensor for detecting the relief condition. When the pressure relief apparatus 200 is a thermally actuated pressure relief apparatus, in some of these embodiments, for example, the trigger mechanism 210 includes a temperature responsive portion 210A. In some embodiments, for example, the temperature responsive portion 210 includes a shape memory alloy, and the relief condition is a temperature at or above a predetermined temperature threshold that effects disposition of the temperature responsive portion 210A. In some embodiments, for example, the receiving of heat energy by the temperature responsive portion 210A effects a change in shape of the heated portion of the temperature responsive portion 210A such that a change in dimension of the temperature-responsive portion 210A is effected. In some of these embodiments, for example, the temperature responsive portion 210A includes a longitudinal axis, and the change in shape includes a reduction in length of the temperature responsive portion 210A along its longitudinal axis. In some embodiments, for example, the temperature responsive portion 210A is a condition detecting sensor, the temperature responsive portion 210A including a wire made with the shape memory alloy, which can detect the relief condition. When the wire has a temperature at or above the predetermined temperature threshold, the wire reduces in length along a longitudinal axis of the wire.

In some embodiments, for example, the material or combination of materials used for the temperature responsive portion 210A has a characteristic temperature at which the material or combination of materials changes in shape in response to receiving sufficient heat energy. In some embodiments, for example, this characteristic temperature falls within a range of temperatures. The material or combination of materials that is selected for the temperature responsive portion 210A is based on corresponding the characteristic temperature of the material or materials at which a change in shape is effected with the desired predetermined temperature threshold at which the trigger mechanism of the pressure relief apparatus 200 is to release the closure member 208. In some embodiments, for example, the desired predetermined temperature threshold at which the trigger mechanism of the pressure relief apparatus 200 is to release the closure member 208 is based on the properties of the contents stored in the tank 100 that is attached to the pressure relief apparatus 200, such as an auto-ignition temperature, a flash point, a temperature at which the contents expand or contract, and a temperature at which the contents may undergo a phase change.

The trigger mechanism 210 is configured to release the closure member 208 when the temperature responsive portion 210A has a temperature at or above the predetermined temperature threshold. A heat source, such as a fire, from which the temperature responsive portion 210A can receive heat energy, and which can effect displacement of the trigger mechanism 210, can also effect heating of the tank 100 to which the pressure relief apparatus 200 is attached. In such cases, in some embodiments, for example, the displacement of the trigger mechanism 210 is effected by the heat before the heating of the tank 100 effects the failure of the tank 100, such that the contents within the tank 100, for example, a pressurized gaseous material, is vented remotely from the fire. Failure of the tank 100 occurs when the integrity of the tank 100 is compromised, such as by, for example, rupturing, breaking or melting. By enabling such venting of the contents within the tank 100 before the failure of the tank 100, the risk of explosion, effected by heating of the contents stored within the tank 100, is mitigated.

In addition to including the temperature responsive portion 210A, the trigger mechanism 210, further includes a retainer 210B. The retainer 210B is for effecting retention the closure member 208 in the closed position, for preventing displacement of the closure member 208 from the closed position to the open position, and for preventing fluid communication between the inlet port 202 and the outlet port 204.

The closure member 208, the retainer 210B, and the temperature responsive portion 210A are cooperatively configured such that, while: (i) the closure member 208 is disposed in the closed position, (ii) the pressure relief apparatus 200 is coupled to the tank 100 such that the inlet port 202 is disposed in fluid communication with contents within the tank 100, and (iii) the temperature of the temperature responsive portion 210A is disposed below a predetermined temperature threshold, the retainer 210B opposes the force being applied to the closure member 208 by the pressure of the pressurized fluid within the tank 100 that is urging the displacement of the closure member 208 from the closed position to the open position, such that the closure member 208 is retained in the closed position by the retainer 210B.

FIGS. 2A, 2B, and 2C depict the pressure relief apparatus 200 in closed position. As depicted in FIGS. 2A, 2B, and 2C, the closure member 208, the retainer 210B, and the temperature responsive portion 210A are further cooperatively configured such that, while: (i) the closure member 208 is disposed in the closed position, and (ii) the pressure relief apparatus 200 is coupled to the tank 100 such that the inlet port 202 is disposed in fluid communication with the contents within the tank 100, such as pressurized gaseous material, the retainer 210B is displaceable, in response to the temperature responsive portion 210A becoming disposed at a temperature at or above a predetermined temperature threshold, such that the closure member 208 becomes released from retention by the retainer 2108 and becomes displaceable from the closed position to the open position in response to urging by the contents within the tank 100.

In this respect, in some embodiments, for example, while the trigger mechanism 210 is disposed in the actuated position such that the closure member 208 is released from retention by the retainer 2108 as depicted in FIG. 2A, the closure member 208 is displaceable from the closed position to the open position in response to a sufficient pressure differential being provided between the inlet port 202 and the outlet port 204 (i.e. while the trigger mechanism 210 is disposed in the actuated position, the closure member 208 is displaced from the closed position to the open position when the pressure differential between the inlet port 202 and the outlet port 204 exceeds a predetermined minimum pressure differential). In some of these embodiments, for example, the inlet port 202 is disposed in fluid communication with the tank 100, and is, thereby, exposed to fluid pressure within the tank 100, and the outlet port 204 is disposed in fluid communication with the atmosphere and is, thereby, exposed to atmospheric pressure, such that, so long as the fluid pressure within the tank 100 exceeds atmospheric pressure by a predetermined minimum threshold, and so long as the trigger mechanism 210 is disposed in the actuated position, the closure member 208 will become displaced from the closed position to the open position. When the closure member 208 is displaced from the closed position to the open position, the contents of the tank 100 are vented out through the outlet port 204.

In some embodiments, for example, the trigger mechanism 210 includes a moveable portion 210C, and an actuator-receiving passage 211 is defined within the body 201. As depicted in FIG. 1A and FIG. 2A, the moveable portion 210C is displaceable from a non-actuating position to an actuating position, within the actuator-receiving passage 211, in response to the relief condition, with effect that the closure member 208 becomes displaceable for effecting fluid communication between the inlet and the outlet ports 202, 204.

In some embodiments, the trigger mechanism 210 further includes a fixedly couplable portion 210D. The fixedly couplable portion 210D is configured for being fixed, or substantially fixed, relative to the body 201 such that, while the fixedly couplable portion 210D is fixed, or substantially fixed, relative to the body 201, the moveable portion 210C is displaceable relative to the fixedly couplable portion 210D such that the spacing between the moveable portion 210C and the fixedly couplable portion 210D is reduced.

In some embodiments, for example, the fixing, or substantial fixing, of the spatial disposition of the fixedly couplable portion 210D, relative to the body 201, is effected by connection between the body 201 and a connector 224, as depicted in FIG. 1A. For example, the connector 224 is made from metallic material, and suitable metallic materials include copper, stainless steel, brass or aluminum, or a combination of said materials. The connector 224 is stiffer than the moveable portion 210C of the trigger mechanism 210. In some embodiments, for example, the connector 224 is of a tubular form, extending from the body 201, and attached to the trigger mechanism 210 with a retaining assembly 226. The retaining assembly 226 includes a washer 226A and a crimp 226B. The washer 226A is disposed in an interference relationship with the connector 224 such that the washer 226A is fixed, or substantially fixed, relative to the connector 224. The trigger mechanism 210 extends through a hole within the washer 226A and its displacement through the hole is restricted by the crimp 226B which is clamped onto an end 210E of the trigger mechanism 210. While the crimp 226B is clamped onto the end 210E of the trigger mechanism 210, the hole of the washer 226A and the crimp 226B are cooperatively configured such that passage of the crimp 226B through the hole, in the direction of the retainer 210B of the trigger mechanism 210, is restricted, with effect that passage of the end 210E of the trigger mechanism 210 towards the retainer 210B is restricted and thereby effecting fixing, or substantial fixing, of the end 210E of the trigger mechanism 210 relative to the body 201.

In some embodiments, for example, the retaining assembly 226 is closed or covered by a cap 229 which is connected to the connector 224. Fastening of the connector 224 to the retaining assembly 226 is then effected with a nut 235, which is threaded to the cap 229, and which forces a ferrule 234 to pinch the connector 224. In this respect, during assembly, the nut 235 and the ferrule 234 are slid over the end of the connector 224 which is desired to be fastened to the cap 229. The connector 224 is then pushed into an aperture provided within the cap 229. The nut 235 is then tightened until the ferrule 234 squeezes the connector 224. For example, the cap 229 is made using metallic material, such as brass or stainless steel. In some embodiments, for example, the cap 229 functions to cover the assembly of the retaining assembly 226 to, amongst other things, prevent, or mitigate, material ingress or physical damage.

In some embodiments, for example, the fixing, or substantial fixing, of the spatial disposition of the fixedly couplable portion 210D, relative to the body 201, is effected by an indirect connection to the body 201. In this respect, in some embodiments, for example, the connector 224 effects attachment of the fixedly couplable portion 210D to the tank 100 to which the body 201 is connected. In some of these embodiments, for example, the connector 224 is a strap, band or other fastener.

It is understood that a portion of the trigger mechanism 210 is not required to be spatially fixed, or substantially fixed, relative to the body 201, in order for the actuation of the closure member 208 to be effected in response to detecting the relief condition, for example, the receiving of heat by the temperature responsive portion 210A. However, by effecting the fixing, or substantial fixing, of the spatial disposition of the fixedly couplable portion 210D, relative to the body 201, displacement of the moveable portion 210C, effected in response to the receiving of heat energy by at least a portion of the temperature responsive portion 210A, is more pronounced (such as, for example, a greater displacement of the moveable portion 210C is realized) than the case where a portion of the trigger mechanism 210 is not spatially fixed, or substantially fixed, relative to the body 201.

In some embodiments, for example, the trigger mechanism 210 is disposed within a sleeve 240 that is disposed within the connector 224. The sleeve 240 functions to reduce friction between the trigger mechanism 210 and the connector 224, during movement of the trigger mechanism 210 through the connector 224, in parallel with the displacement of the retainer 210B. In some embodiments, for example, the sleeve 240 is disposed in interference fit relationship with the connector 224. In some embodiments, for example, the sleeve 240 is made from a plastic, such as polytetrafluoroethylene. In some embodiments, for example, the sleeve 240 is made from TEFLON™.

In some embodiments, for example, the temperature responsive portion 210A is disposed at least between the fixedly couplable portion 210D and the moveable portion 210C. In some of these embodiments, for example, the moveable portion 210C includes at least a portion of the temperature responsive portion 210A.

In some embodiments, for example, where the pressure relief apparatus is a thermally actuated pressure relief apparatus, in response to the receiving of heat energy, the heated portion of the temperature responsive portion 210A effects exertion of a tensile force, thereby effecting the displacement of the moveable portion 210C relative to the fixedly couplable portion 210D such that the moveable portion 210C is displaced from the non-actuated position to the actuated position.

In some embodiments (not shown), for example, the moveable portion 210C includes the retainer 210B, such that the retainer 210B translates with the moveable portion 210C, and such that the displacement of the moveable portion 210C, relative to the fixedly coupled portion 210D, effects the displacement of the retainer 210B to release the closure member 208 from retention.

In some embodiments, for example, the moveable portion 210C is separate from the retainer 210B, as depicted in FIG. 1A and FIG. 2A. In this respect, in some embodiments, for example, the trigger mechanism 210 includes a retainer actuator 210X that is separate from the retainer 210B. The retainer actuator 210X is displaceable from a retaining position to a released position. While disposed in the retaining position, the retainer actuator 210X is retaining the retainer 210B in a position relative to the closure member 208 such that the retainer 210B prevents the displacement of the closure member 208 from the closed position to the open position. While disposed in the released position, the retainer 210B is released from retention by the retainer actuator 210X such that the retainer 2108 is displaceable relative to the closure member 208 such that retention of the closure member 208 by the retainer 210B is releasable, and that the closure member 208 is displaceable from the closed position, as depicted in FIG. 1A, to the open position, as depicted in FIG. 2A.

In those embodiments where the retainer actuator 210X is separate from the retainer 210B, in some of these embodiments, for example, and referring to FIGS. 1 and 2, the retainer 210B includes a free ball 210BB. In some embodiments, for example, the material of construction of the ball 210BB is steel.

In some embodiments, for example, the retention of the closure member 208 in the closed position by the ball 210BB is effected by interference to displacement of the closure member, from the closed position to the open position, by the ball 210BB. In some embodiments, for example, the interference is effected by disposition of the ball 210BB within a recess 208C (such as, for example, a cut-out) of the closure member 208. Co-operatively, in effecting this interference, the retainer actuator 210X and a ball-retaining surface 201A of the body 201 prevents, or substantially prevents, release of the ball 210BB from its disposition within the recess, while the retainer actuator 210X is disposed in the retaining position.

In this respect, the ball-retaining surface 201A, prevents, or substantially prevents, displacement of the ball 210BB, relative to the body 201, that is being urged by a pressure differential established between the inlet 202 and the outlet 202, that is urging the displacement of the closure member 208 from the closed position to the open position. The force (arising from a pressure differential, such as a pressure differential that exceeds the predetermined minimum pressure differential) that is urging the displacement of the closure member 208 from the closed position to the open position, in combination with the above-described opposition provided by the ball-retaining surface 201A, results in a net force that urges release of the ball 210BB from the recess 208C, and, while disposed in the retaining position, the retainer actuator 210X opposes such force and retains the ball 210BB within the recess 208C (in the illustrated embodiment, the retainer actuator 210X prevents, or substantially prevents, movement of the ball 210BB along an axis that is orthogonal to the axis along which the closure member 208 is movable to the open position). When the retainer actuator 210X becomes disposed in the released position, such opposition is absent, permitting the pressure differential to liberate the ball 210BB from the recess, and thereby releasing the closure member 208 from retention by the ball 210BB and enabling its displacement to the open position, in response to application of a pressure differential between the inlet 202 and the outlet 204 that exceeds the minimum predetermined pressure differential, as explained above.

While the retainer actuator 210X is disposed in the retaining position, and gaseous material is disposed within the tank 100 such that a pressure differential, exceeding the predetermined minimum pressure differential, is urging displacement of the closure member 208 to the open position, force is transmitted by the closure member 208 to the ball 210BB, and the ball 210BB transmits most of the force being applied to the closure member 208 onto the body 201, while transmitting a smaller force onto the actuator 210. By having the retainer 210B separated from the temperature responsive portion 210A, such as is the case with the above-described embodiments with the ball 210BB, less frictional resistance is impartable to the moveable portion 210C when it is being displaced by tensile forces resulting from the receiving of heat by the temperature responsive portion 210A, compared to when the retainer 210B is integral with the moveable portion 210C. This allows for greater flexibility in the choice of materials for the temperature responsive portion 210A, which may, for example, be a wire (for example, comprising a shape memory alloy).

In those embodiments where the material of the temperature responsive portion 210A is a shape memory alloy, in some of these embodiments, for example, the temperature, at which the temperature responsive portion 210A assumes a change in shape, is modified with a shape changing temperature modifier 212. In those embodiments, for example, the shape changing temperature modifier 212 includes a biasing member 216. The biasing member 216, the temperature responsive portion 210A, and the fixedly couplable portion 210D are cooperatively configured such that, while the fixedly couplable portion 210D is coupled to the tank 100, the biasing member 216 urges (or biases) the temperature responsive portion 210A away from the fixedly couplable portion 210D, and the urging effects a change to the shape changing characteristics of the temperature responsive portion 210A.

In some embodiments, for example, the trigger mechanism 210 includes a housing 218, such that the moveable portion 210C includes the housing 218. The temperature responsive portion 210A is pinched between a pin 214 and the housing 218, such that the temperature responsive portion 210A is coupled to the housing 218. The housing 218 contains the biasing member 216. For example, the biasing member 216 is a resilient member, such as a spring. For example, the spring is a coil spring made from steel. The biasing member 216 is coupled to the body 201 with a retainer 220. The retainer 220 is fastened to the body 201. For example, the retainer 220 is in the form of a nut which threads into complementary threads provided on an external surface of the body 201, thereby retaining the biasing member 216 relative to the body 201. For example, the material of the retainer 220 is metallic. Suitable metallic materials include brass, aluminum, or stainless steel. For example, the material of the pin 214 is a metal, such as steel. In some embodiments, for example, the attachment of the connector 224 to the body 201 is effected by connection of the connector to the retainer 220.

As depicted in FIG. 1A, the biasing member 216, the housing 218, and the fixedly couplable portion 210D are cooperatively configured such that, while the fixedly couplable portion 210D is fixedly coupled to the tank 100, the biasing member 216 presses against the housing 218, urging the housing 218 away from the fixedly couplable portion 210D. The retainer 220 includes a passage 222 which receives the temperature responsive portion 210A so as to facilitate the coupling of the temperature responsive portion 210A to the shape changing temperature modifier 212 and to facilitate movement of the moveable portion 210C (which, in this case, includes the temperature responsive portion 210A). In this respect, while the fixedly couplable portion 210D is fixedly coupled to the tank 100, by pressing against the housing 218, and urging the housing 218 away from the fixedly couplable portion 210D, the biasing member 216 effects application of a tensile force to the temperature responsive portion 210A such that the shape changing temperature characteristics of the temperature responsive portion 210A are modified.

The biasing member 216 and the temperature responsive portion 210A are cooperatively configured, in effect, to calibrate the characteristic temperature of the temperature responsive portion 210A such that the calibrated characteristic temperature corresponds to the desired predetermined temperature threshold at which the trigger mechanism of the pressure relief apparatus 200 is desired to release the closure member 208. In some embodiments, for example, the biasing member 216 is used when no material has a characteristic temperature that corresponds with the desired predetermined temperature threshold at which the trigger mechanism of the pressure relief apparatus 200 is desired to release the closure member 208, or such a material does exist, but it is not feasible to obtain this material.

In some embodiments, for example, the biasing member 216 is positioned relative to the housing 218 to urge the housing 218 away from the fixedly couplable portion 210D, as depicted in FIG. 1A and FIG. 2A. As depicted in FIG. 1A and FIG. 2A, the biasing member 216 and the temperature responsive portion 210A are on the same side of the housing 218. By urging the housing 218 away from the fixedly couplable portion 210D, the biasing member 216 increases the characteristic temperature of the temperature responsive portion 210A, and also increases the predetermined temperature threshold at which the trigger mechanism of the pressure relief apparatus 200 is desired to release the closure member 208. In other embodiments, for example, the biasing member 216 is positioned relative to the housing to urge the housing 218 towards the fixedly couplable portion 210D. In such an embodiment, for example, the biasing member 216 and the temperature responsive portion 210A are on opposite sides of the housing 218 (not depicted). By urging the housing 218 towards the fixedly couplable portion 210D, the biasing member 216 decreases the characteristic temperature of the temperature responsive portion 210A, and also decreases the predetermined temperature threshold at which the trigger mechanism of the pressure relief apparatus 200 is desired to release the closure member 208.

As described above, when the pressure relief apparatus 200 is a thermally actuated pressure relief apparatus, the trigger mechanism 210 comprises the temperature responsive portion 210A coupled to the housing 218 of the moveable portion 210C. When heat energy is received by the temperature responsive portion 210A such that the temperature of the temperature responsive portion 210A is at or above a predetermined temperature threshold, the temperature responsive portion 210 reduces in length and displaces the moveable portion 210C, relative to the fixedly couplable portion 210D, such that, in response, the retention of the ball 210BB is released by the release actuator 210X (in this respect, the release actuator 210X has now become disposed in the released position), such that the ball 210BB is displaceable relative to the closure member 208 with effect that retention of the closure member 208 by the retainer 210B is releasable.

While the ball 210BB is released from retention by the retainer actuator 210X, the ball 210BB is displaceable, so as to effect the release of the closure member 208 in response to a sufficient pressure differential being provided between the inlet port 202 and the outlet port 204, from a closed position to an open position.

In this manner, the pressure relief apparatus 200 is a temperature-activated pressure relief apparatus, such that the pressure relief apparatus 200 is triggered upon detection of a temperature at or above a predetermined temperature threshold for the trigger mechanism to release the closure member 208.

Other configurations are possible to activate the trigger mechanism 210 to release the closure member 208. In some embodiments, for example, the trigger mechanism 210 is triggered with pressure to release the closure member 208. FIG. 3A, FIG. 3B, and FIG. 3C depict a pressure relief apparatus 300 that is triggered by either temperature or pressure to release the closure member 208. That is, the pressure relief apparatus 300 is thermally actuated or pressure actuated. The closure member 208 of the pressure relief apparatus 300 as depicted in FIG. 3A is in the closed position, such that fluid communication between the inlet port 202 and the outlet port 204 is sealed or substantially sealed.

The pressure relief apparatus 300 is generally similar to the pressure relief apparatus 200 as depicted in FIG. 1A and FIG. 2A, except that the pressure relief apparatus 300 can be pressure actuated. In some embodiments, for example, the pressure relief apparatus 300 comprises a compartment 302 that is disposed for pressurization, for example, by receiving a pressurized fluid such as a pressurized gaseous material, which applies a force on the surfaces defining the compartment 302. In some embodiments, for example, the compartment 302 comprises a chamber opening 304. The pressurized fluid in the compartment 302 applies a force through this opening 304. The magnitude of this force is a function of the pressure in the compartment 302 and the area of the opening 304.

In some embodiments, for example, the compartment 302 is defined in the body 201 of the pressure relief apparatus 300, such that it is an internal component of the body 201 of the pressure relief apparatus 300, as depicted in FIG. 3A. In other embodiments, for example, the compartment 302 is an external component to the body 201. For example, the compartment 302 is connected to the body 201 by welding or using fastening devices such as a combination of threaded studs, washers and nuts, or by another appropriate fastening device. Where the compartment 302 is external to the body 201, the compartment 302 is constructed with the same material as the body 201, such as metal. Suitable metallic materials include brass, aluminum, or stainless steel, or a combination of these materials.

In some embodiments, for example, the dimensions, size, and shape of the compartment 302 are selected to receive sufficient pressurized fluid for achieving and maintaining a characteristic pressure upon receiving the pressurized fluid. In some embodiments, for example, this characteristic pressure falls within a range of pressures, depending on the pressure of the pressurized fluid. The dimensions and sizing of the compartment 302 are selected based on corresponding the characteristic pressure of the compartment 302 with the desired predetermined pressure threshold at which the trigger mechanism 210 of the pressure relief apparatus 300 is configured to release the closure member 208.

In some embodiments, for example, the compartment 302 has a spherical, cylindrical, or rectangular shape. In other embodiments, for example, the compartment 302 has an irregular geometrical shape.

The dimensions and size of the compartment 302 are selected based on the desired predetermined pressure threshold at which the trigger mechanism 210 of the pressure relief apparatus 300 is configured to release the closure member 208.

The orientation and position of the compartment 302 relative to the body 201 is determined based on the desired direction of the force applied by the pressurized fluid in the compartment 302 through the chamber opening 304. In some embodiments, for example, the compartment 302 is positioned relative to the trigger mechanism 210 such that the compartment 302 fluidly communicates with the trigger mechanism 210. When the compartment 302 is pressurized, the pressurized fluid received within the compartment 302 is in fluid communication with the trigger mechanism 210, and applies a force through the opening 304 on the trigger mechanism 210 to urge the trigger mechanism 210 from a non-actuating position to an actuating position. As depicted in FIG. 3A, the pressurized fluid within the compartment 302 applies a force through the opening 304 on the trigger mechanism 210 to urge the moveable portion 210C towards the fixedly couple portion 210D. As depicted in FIG. 3A, the chamber opening 304 of the compartment 302 is positioned adjacent to the housing 218 of the trigger mechanism 210, such that the compartment 302 opposes the temperature responsive portion 210A and the biasing member 216. When the compartment 302 is pressurized, the pressurized fluid within the compartment 302 applies a force through the opening 304 on the housing 218. As depicted in FIG. 3A, the chamber opening 304 is oriented relative to the housing 218 such that the force applied to the housing 218 is generally perpendicular to the base of the housing 218 for urging the moveable portion 210C towards the fixedly couple portion 210D. The force applied on the housing 218 by the pressurized fluid in the compartment 302 is in a direction that urges the moveable portion 210C towards the fixedly couplable portion 210D.

As depicted in FIG. 3A and FIG. 4A, the pin 214 extends into the compartment 302. In some embodiments, for example, the pin 214 does not extend into the compartment 302.

In some embodiments, for example, the pressure relief apparatus 300 comprises a vent gas conduit 306 for directing a pressurized fluid from a pressurized fluid source into the compartment 302 to pressurize the compartment 302. A first end of the vent gas conduit 306 is fluidly connected to the pressurized fluid source, and the second end of the vent gas conduit 306 is fluidly connected to the compartment 302. In some embodiments, for example, the pressurized fluid source is an external pressurized fluid source to the pressure relief apparatus 300.

In some embodiments, for example, the vent gas conduit 306 is defined in the body 201 of the pressure relief apparatus 300, such that it is an internal component of the body 201 of the pressure relief apparatus 300, as depicted in FIG. 3A. The vent gas conduit 306 is configured to effect fluid communication between the outlet port 204 and the compartment 302. The compartment 302 is disposed for being pressurized by a pressurized fluid from an external pressurized fluid source, the pressurized fluid flowing through the outlet port 204 and directed into the compartment 302 by the vent gas conduit 306. As shown in FIG. 3A, the vent gas conduit 306 fluidly connects the compartment 302 and the outlet port 204, such that a pressurized fluid entering the pressure relief apparatus 300 through the outlet port 204 is directed into the compartment 302 by the vent gas conduit 306 and pressurizes the compartment 302. The compartment 302 receives the pressurized fluid from the outlet port 204 and communicates the received pressurized fluid to the trigger mechanism 210. The pressurized fluid is directed by the vent gas conduit 306 past the closure member 208, the retainer 210B, and the ball 210BB into the compartment 302.

In other embodiments, for example, the vent gas conduit 306 is an external component to the body 201. For example, the vent gas conduit 306 is connected to the compartment 302 at one end and the pressurized fluid source at another end by welding or using fastening devices such as a combination of clamps, threaded studs, washers and nuts, or by another appropriate fastening device. Where the vent gas conduit 306 is external to the body 201, the vent gas conduit 306 is constructed with the same material as the body 201, such as metal. Suitable metallic materials include brass, aluminum, or stainless steel. In some embodiments, for example, the vent gas conduit 306 is constructed with a material appropriate for directing the pressurized fluid to the compartment 302, such as plastic or rubber.

The trigger mechanism 210 is configured to direct the flow of the pressurized fluid in the vent gas conduit 306 into the compartment 302. The trigger mechanism 210 is sealingly engaged to the body 201 such that the pressurized fluid is prevented, or substantially prevented, from being conducted past the trigger mechanism 210. The trigger mechanism 210 is further configured to restrict the pressurized fluid from flowing into the portion of the actuator-receiving passage 211 on the side of the housing 218 that opposes the compartment 302.

The trigger mechanism 210 is disposed relative to the compartment 302 such that the pressurized fluid received within the compartment 302 is prevented, or substantially prevented, from being conducted past the trigger mechanism 210, such that movement of the trigger mechanism 210 is effectable by the pressurized fluid for effecting the release of retention of the closure member 208. In some embodiments, for example, the housing 218 and the actuator-receiving passage 211 are sized such that the gap defined between the housing 218 and the actuator-receiving passage 211 has an area that is substantially smaller than the area of the vent gas conduit 306. For example, the area of the gap defined between the housing 218 and the actuator-receiving passage 211 is less than half of the area of the vent gas conduit 306. As another example, as depicted in FIG. 3A, a vent gas seal 308, such as an O-ring, is positioned around the housing 218 between the compartment 302 and the actuator-receiving passage 211 to prevent flow of pressurized gas from the compartment 302 and the vent gas conduit 306 into the portion of the actuator-receiving passage 211 on the side of the housing 218 that opposes the compartment 302.

In some embodiments, for example, by directing the flow of the pressurized fluid into the compartment 302, and restricting the flow of the pressurized fluid from flowing into the portion of the actuator-receiving passage 211 on the side of the housing 218 that opposes the compartment 302, the compartment 302 is pressurized at or above the predetermined pressure threshold. When the compartment 302 is pressurized at or above the predetermined pressure threshold, the force applied to the housing 218 by the pressurized fluid in the compartment 302 through the chamber opening 304 is greater than the force applied to the housing 218 that urges the housing 218 away from the fixedly couplable portion 210D (e.g. the forces applied to the housing 218 by the biasing member 216 positioned as depicted in FIG. 3A, and by fluid that may be in the portion of the actuator-receiving passage 211 on the side of the housing 218 that opposes the compartment 302), and disposes the trigger mechanism 210 from a non-actuating position to an actuating position within the actuator-receiving passage 211, which releases the retainer 210S, with effect that the closure member 208 becomes displaceable for effecting fluid communication between the inlet port 202 and the outlet port 204.

As depicted in FIG. 3A, the closure member 208, the retainer 210B, for example the ball 210BB, the compartment 302, the vent gas conduit 306 and the trigger mechanism 210 are cooperatively configured such that, while: (i) the closure member 208 is disposed in the closed position, (ii) the pressure relief apparatus 300 is coupled to the tank 100 such that the inlet port 202 is disposed in fluid communication with contents within the tank 100, (iii) the vent gas conduit 306 is fluidly connected to the compartment 302 at one end and to a pressurized fluid source on the other end, (iv) the pressurized fluid from the pressurized fluid source is directed into the compartment 302 by the vent gas conduit 306, and (v) the compartment 302 is pressurized by the pressurized fluid at a pressure below a predetermined pressure threshold, there is an insufficient force applied to the housing 218 from the pressurized fluid in the compartment 302 to overcome the forces applied to the housing 218 that urges the housing 218 away from the fixedly coupled portion 210D (e.g. the forces applied to the housing 218 by the biasing member 216 positioned as depicted in FIG. 3A, and by fluid that may be in the portion of the actuator-receiving passage 211 on the side of the housing 218 that opposes the compartment 302) to actuate the trigger mechanism 210. With the trigger mechanism 210 in the non-actuating position, the retainer 210B opposes the force being applied to the closure member 208 by the pressurized gaseous material within the tank 100 that is urging the displacement of the closure member 208 from the closed position to the open position, such that the closure member 208 is retained in the closed position by the retainer 210S.

As depicted in FIG. 4A, the closure member 208, the retainer 210B, for example the ball 210BB, the compartment 302, the vent gas conduit 306 and the trigger mechanism 210 are further cooperatively configured such that, while: (i) the closure member 208 is disposed in the closed position, (ii) the pressure relief apparatus 300 is coupled to the tank 100 such that the inlet port 202 is disposed in fluid communication with contents within the tank 100, (iii) the vent gas conduit 306 is fluidly connected to the compartment 302 at one end and to a pressurized fluid source on the other end, (iv) the pressurized fluid from the pressurized fluid source is directed into the compartment 302 by the vent gas conduit 306, and (v) the compartment 302 is pressurized by the pressurized fluid at or above a predetermined pressure threshold, there is a sufficient force applied to the housing 218 from the pressurized fluid in the compartment 302 to overcome the forces applied to the housing 218 that urges the housing 218 away from the fixedly coupled portion 210D (e.g. the forces applied to the housing 218 by the biasing member 216 positioned as depicted in FIG. 3A, and by fluid that may be in the portion of the actuator-receiving passage 211 on the side of the housing 218 that opposes the compartment 302) to actuate the trigger mechanism 210. With the trigger mechanism 210 in the actuating position, the retainer 2108 is displaceable, in response to the compartment 302 becoming pressurized at a pressure at or above a predetermined pressure threshold, such that the closure member 208 becomes released from retention by the retainer 210B and becomes displaceable from the closed position to the open position in response to urging by the contents within the tank 100.

In this respect, in some embodiments, for example, while the trigger mechanism 210 is, upon pressurization of the compartment 302 at or above a predetermined pressure threshold, disposed in the actuated position such that the closure member 208 is released from retention by the retainer 2108 as depicted in FIG. 4A, the closure member 208 is displaceable from the closed position to the open position in response to a sufficient pressure differential being provided between the inlet port 202 and the outlet port 204 (i.e. while the trigger mechanism 210 is disposed in the actuated position, the closure member 208 is displaced from the closed position to the open position when the pressure differential between the inlet port 202 and the outlet port 204 exceeds a predetermined minimum pressure differential). In some of these embodiments, for example, the inlet port 202 is disposed in fluid communication with the tank 100, and is, thereby, exposed to fluid pressure within the tank 100, and the outlet port 204 is disposed in fluid communication with the atmosphere and is, thereby, exposed to atmospheric pressure, such that, so long as the fluid pressure within the tank 100 exceeds atmospheric pressure by a predetermined minimum threshold, and so long as the trigger mechanism 210 is disposed in the actuated position, the closure member 208 will become displaced from the closed position to the open position. When the closure member 208 is displaced from the closed position to the open position, the contents of the tank 100 are vented out through the outlet port 204.

In this respect, the pressure relief apparatus 300 is configured to be vented either upon detection by the temperature responsive portion 210 of the temperature at or above the predetermined temperature threshold, or upon pressurization of the compartment 302 at or above a predetermined pressure threshold. The trigger mechanism 210 and the closure member 208 of the pressure relief apparatus 300 are cooperatively configured such that the closure member 208 becomes released from retention and moveable for effecting establishment of fluid communication between the inlet port 202 and the outlet port 204 in response to receiving of heat energy by the temperature responsive portion. Further, the trigger mechanism 210, the closure member 208, and the compartment 302 of pressure relief apparatus 300 are cooperatively configured such that the closure member 208 becomes released from retention and moveable for effecting establishment of fluid communication between the inlet port 202 and the outlet port 204 in response to the communication of the pressurized fluid to the trigger mechanism 210 via the compartment 302.

When the contents of the tank 100 are vented out through the outlet port 204, in some embodiments, for example, the contents are vented to the atmosphere. In other embodiments, for example, where the contents of the tank pose a safety hazard, a health hazard, an environmental hazard, or the like, the contents of the tank 100 are directed to an appropriate venting area or processing equipment using piping, hoses, and other pressurized fluid transporting devices that are appropriate for the particular contents of the tank 100.

As described above, when the pressure relief apparatus 300 is triggered by pressure to release the closure member 208, the pressure relief apparatus 300 comprises a compartment 302 and a vent gas conduit 306 for activating the trigger mechanism 210 to release the closure member 208. The vent gas conduit 306 directs a pressurized fluid from a pressurized fluid source into the compartment 302. When the compartment 302 is pressurized at or above the predetermined pressure threshold, the force applied to the housing 218 by the pressurized fluid in the compartment 302 through the chamber opening 304 is greater than the force applied to the housing 218 that urges the housing 218 away from the fixedly couplable portion 210D (e.g. the forces applied to the housing 218 by the biasing member 216 positioned as depicted in FIG. 3A, and by fluid in the portion of the actuator-receiving passage 211 on the side of the housing 218 that opposes the compartment 302), and disposes the trigger mechanism 210 from a non-actuating position to an actuating position within the actuator-receiving passage 211, which releases the retainer 210B, with effect that the closure member 208 becomes displaceable for effecting fluid communication between the inlet port 202 and the outlet port 204, and vents the contents of the tank 100 through the outlet port 204.

In some embodiments, for example, a plurality of relief apparatuses are fluidly connected to each other to create a vent system 310 for controlling the pressure of a pressurized system.

The pressurized system that the vent system 310 can vent is either a single-tank system or a multi-tank system. In some embodiments, for example, the relief apparatuses of the vent system 310 are attached to one tank 100 at different positions of the tank 100. In other embodiments, for example, the relief apparatuses of the vent system 310 are attached to a multi-tank system, with at least one relief apparatus in fluid communication with each tank 100 of the multi-tank system.

In some embodiments, for example, the vent system 310 controls pressure of a pressurized system, the pressurized system comprising a first tank and a second tank. The vent system 310 comprises the first tank in fluid communication with a first relief apparatus, the first relief apparatus comprising an inlet port and an outlet port, the second tank in fluid communication with a second relief apparatus, the second relief apparatus comprising an inlet port and an outlet port, the outlet port of the first relief apparatus in fluid communication with the outlet port of the second relief apparatus, wherein the second relief apparatus is configured to be triggered for venting the second tank in response to receiving gaseous material vented from the first tank. A vent tube 312 effects fluid communication between the outlet port of the first relief apparatus and the outlet port of the second relief apparatus.

In some embodiments, for example, the second relief apparatus is a pressure relief apparatus 300 as described herein. In some embodiments, for example, both of the first relief apparatus and the second relief apparatus are pressure relief apparatuses 300 as described herein.

In some embodiments, for example, a plurality of pressure relief apparatuses 300 are fluidly connected to each other to create the vent system 310 for venting the pressurized system, such that when one pressure relief apparatus 300 is triggered to vent the contents of the pressurized system, either upon detection of a temperature at or above a predetermined temperature threshold or pressurization of the compartment 302 at or above a predetermined pressure threshold, the compartment 302 of at least one other pressure relief apparatus 300 is pressurized at or above a predetermined pressure threshold, thereby triggering the at least one other pressure relief apparatus 300 to vent the pressurized system. In some embodiments, for example, the outlet port 204 of each pressure relief apparatus 300 in the vent system 310 is fluidly connected to the compartment 302 of each other pressure relief apparatus 300 in the vent system 310 through the vent gas conduits 306. In some embodiments, for example, where the vent gas conduit 306 is defined in the housing 210 as an internal component of the pressure relief apparatus 300, and where the vent gas conduit 306 fluidly communicates the compartment 302 and the outlet port 204, the outlet ports 204 of the pressure relief apparatuses 300 in the vent system 310 are fluidly connected.

In some embodiments, for example, for the pressure relief apparatuses 300 configured into the vent system 310, the pressurized fluid source for pressurizing the compartment 302 is the venting of at least one other pressure relief apparatus 300 in the vent system 310.

FIG. 5 depicts an embodiment of the vent system 310, where the outlets 204 of two pressure relief apparatuses 300A and 300B are fluidly connected. The pressure relief apparatuses 300A and 300B are generally similar to the pressure relief apparatus 300 as described with respect to FIG. 3A and FIG. 4A. The inlet ports 202 of the pressure relief apparatuses 300A and 300B are configured to be in communication, for example, fluidly coupled, to a pressurized system for receiving the contents of the pressurized system. In some embodiments, for example, the inlet port 204 of the pressure relief apparatus 300A is fluidly connected to a tank 100A (not depicted), and the inlet port 204 of the pressure relief apparatuses 300B is fluidly connected to a tank 100B (not depicted). While FIG. 5 depicts the vent system 310 comprising two pressure relief apparatuses 300A and 300B that are fluidly connected, in some embodiments, for example, the vent system 310 comprises more than two pressure relief apparatuses that are fluidly connected.

In some embodiments, for example, where the outlet ports 204 of the pressure relief apparatuses 300 are fluidly connected to each other, the outlet ports 204 are fluidly connected to each other using the vent tube 312. As depicted in FIG. 5, the outlets 204 of each of the two pressure relief apparatuses 300A and 300B are connected to the vent tube 312 with welding or by using fastening devices such as a combination of threaded studs, washers and nuts, or by another appropriate fastening device. The vent tube 312 may comprise a plurality of portions, each portion fluidly coupled to the outlet port of each relief apparatus of the vent system 310. As depicted in FIG. 5, the vent tube 312 comprises two or more portions, vent tube portion 312A and vent tube portion 312B, such that the vent tube portion 312A is fluidly coupled to the outlet port 204 of pressure relief apparatus 300A, and the vent tube portion 312B is fluidly coupled to the outlet port 204 of pressure relief apparatus 300B. The contents vented through the outlet port 204 of the pressure relief apparatus 300A flow through the vent tube portion 312A, and the contents vented through the outlet port 204 of the pressure relief apparatus 300B flow through the vent tube portion 312B. The vent tube 312 is constructed using a material that is appropriate for transporting the contents vented from the pressure relief apparatuses 300, such as metal or rubber.

The vent tube portions 312A and 312B are fluidly connected to each other using fastening devices such as welding or a combination of threaded studs, washers and nuts, or by another appropriate fastening device. The vent tube portions 312A and 312B of the vent system 310 are further fluidly connected to a common vent 314, such that the contents vented by any pressured relief apparatuses 300 within the vent system 310 will be directed by the vent tube portions 312A and 312B to vent through the common vent 314. That is, whether the pressure relief apparatus 300A or the pressure relief apparatus 300B depicted in FIG. 5 is triggered to vent, for example, upon detection of a relief condition such as a temperature at or above a predetermined temperature threshold by the temperature responsive portion 210A, or upon pressurization of the compartment 302 at or above a predetermined pressure threshold, the vented contents flow through the vent tube portions 312A and 312B, and then flow through the common vent 314 to an area for venting the contents of the pressurized system.

When one or more pressure relief apparatuses 300 of the vent system 310 is triggered to vent contents, for example, upon detection of a temperature at or above a predetermined temperature threshold or upon pressurization of the compartment 302 at or above a predetermined pressure threshold, the pressure of the vent system 310 increases, due to the introduction of the vented contents from the pressurized system into the vent system 310. As depicted in FIG. 5, since the vent tube portions 312A and 312B of the vent system 310 are fluidly connected, the pressure relief apparatuses 300 of the vent system 310 are also fluidly connected, by virtue of each pressure relief apparatus 300 being fluidly connected to its corresponding vent tube portions 312A and 312B. As such, when one or more pressure relief apparatuses 300 of the vent system 310 is triggered to vent contents, the other pressure relief apparatuses 300 of the vent system 310 receives pressurized fluid through its respective outlet port 204. For example, the pressurized fluid is pressurized air from the vent system 310, or the contents vented from the pressurized system. The pressurized fluid, which was introduced into the vent system 310 from the triggering of one or more pressure relief apparatuses 300, flows from the one or more triggered pressure relief apparatuses 300 to the other pressure relief apparatuses 300 in the vent system 310. The pressurized fluid pressurizes the compartment 302 of at least one other pressure relief apparatus 300 and triggers the at least one other pressure relief apparatus 300 in the vent system 310 to release their respective closure member 208 to effect fluid communication between the inlet port 202 and the outlet port 204 of the at least one other pressure relief apparatus 300.

As depicted in FIG. 5, the pressure relief apparatuses 300A and 300B are cooperatively configured such that, when one of the pressure relief apparatuses 300 (e.g. pressure relief apparatus 300A) is triggered to release the closure member 208, for example, upon detection of a temperature at or above a predetermined temperature threshold or upon pressurization of the compartment 302 at or above a predetermined pressure threshold, to vent a tank 100 (e.g. tank 100A), the other pressure relief apparatus 300 (e.g. pressure relief apparatus 300B) receives pressurized fluid through its outlet port 204 and is triggered to release the closure member 208 upon pressurization of its compartment 302 at or above a predetermined pressure threshold, where the compartment 302 of the other pressure relief apparatus 300 is pressurized due to the venting of the first pressure relief apparatus 300.

As depicted in FIG. 5, while the pressure relief apparatus 300A is triggered, for example, upon detection of a temperature at or above a predetermined temperature threshold or upon pressurization of the compartment 302 at or above a predetermined pressure threshold, to release its closure member 208 and vents the tank 100A, thereby increasing the pressure of the vent system 310, for the pressure relief apparatus 300B: (i) the closure member 208 is disposed in the closed position, (ii) the pressure relief apparatus 300B is coupled to the tank 100B such that the inlet port 202 is disposed in fluid communication with contents within the tank 1008, (iii) the vent gas conduit 306 is fluidly connected to the compartment 302 at one end and to vent tube portion 312B on the other end, (iv) the pressurized fluid due to venting of the pressure relief apparatus 300A is directed into the compartment 302 by the vent gas conduit 306, and (v) the compartment 302 of the pressure relief apparatus 300B is pressurized by the pressurized fluid at a pressure at or above a predetermined pressure threshold, there is a sufficient force applied to the housing 218 of the pressure relief apparatus 300B from the compartment 302 to overcome the forces applied to the housing 218 that urges the housing 218 away from the fixedly coupled portion 210D (e.g. the forces applied to the housing 218 by the biasing member 216 positioned as depicted in FIG. 3A, and by fluid in the portion of the actuator-receiving passage 211 on the side of the housing 218 that opposes the compartment 302) to actuate the trigger mechanism 210 of the pressure relief apparatus 300B. With the trigger mechanism 210 in the actuating position, the retainer 210B is displaceable, in response to the compartment 302 becoming pressurized at a pressure at or above a predetermined pressure threshold, such that the closure member 208 becomes released from retention by the retainer 210B and becomes displaceable from the closed position to the open position in response to urging by the contents within the tank 1008.

In this respect, in some embodiments, for example, while the trigger mechanism 210 of pressure relief apparatus 300B is, upon pressurization of the compartment 302 at or above a predetermined pressure threshold by the pressurized fluid due to venting of the pressure relief apparatus 300A, disposed in the actuated position such that the closure member 208 is released from retention by the retainer 210B as depicted in FIG. 4A, the closure member 208 is displaceable from the closed position to the open position in response to a sufficient pressure differential being provided between the inlet port 202 and the outlet port 204 (i.e. while the trigger mechanism 210 is disposed in the actuated position, the closure member 208 is displaced from the closed position to the open position when the pressure differential between the inlet port 202 and the outlet port 204 exceeds a predetermined minimum pressure differential). In some of these embodiments, for example, the inlet port 202 of the pressure relief apparatus 300B is disposed in fluid communication with the tank 1008, and is, thereby, exposed to fluid pressure within the tank 1008, and the outlet port 204 is disposed in fluid communication with the vent tube portion 312B and the common vent 314 and is, thereby, exposed to the pressure of the vent system 310, such that, so long as the fluid pressure within the tank 1008 exceeds the pressure of the vent system 310, such as the pressure of the pressurized fluid received into pressure relief apparatus 300B through its outlet port 204, by a predetermined minimum threshold, and so long as the trigger mechanism 210 is disposed in the actuated position, the closure member 208 will become displaced from the closed position to the open position. When the closure member 208 is displaced from the closed position to the open position, the contents of the tank 1008 are vented out through the outlet port 204 into the vent tube portion 312B.

In some embodiments, for example, the venting of pressure relief apparatus 300A in the vent system 310 triggers at least one other pressure relief apparatus 300 in the vent system 310 to release their respective closure member 208. All triggered pressure relief apparatuses 300 in the vent system 310 will vent through their outlets 204 through the vent tube portions 312A and 312B and through the common vent 314. As depicted in FIG. 5, the venting of pressure relief apparatus 300A triggers the pressure relief apparatus 300B to release its closure member 208 and vent the contents of tank 1008, and the vented contents of tanks 100A and 1008 flow through the vent tubes portions 312A and 312B, respectively, to the common vent 314.

Figure 6:
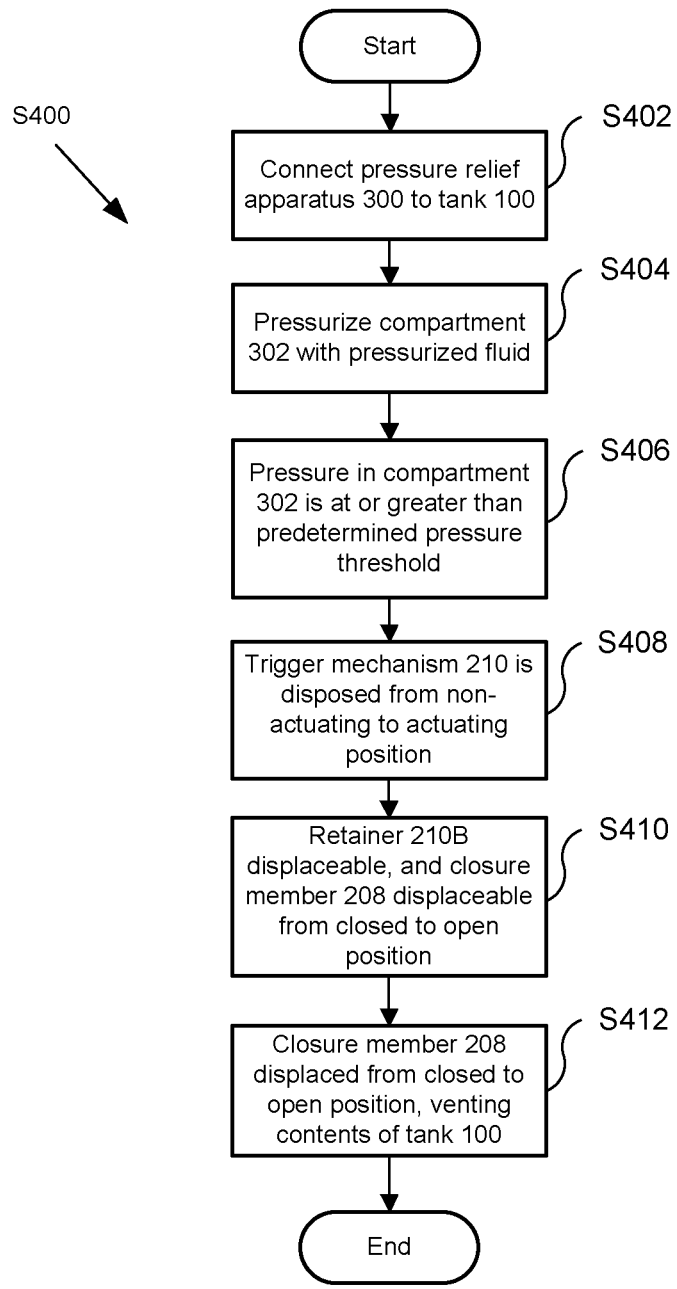
FIG. 6 is a flow chart depicting a method of controlling pressure in a tank with the pressure relief device of FIG. 3A.

FIG. 6 depicts a process S400 for controlling pressure in a tank 100 with the pressure relief apparatus 300 depicted in FIG. 3A, where, in response to pressurization of the compartment 302 by a flow of pressurized fluid at or above a predetermined pressure threshold, the pressure relief apparatus 300 is triggered to release the closure member 208 and vent the contents of the tank 100. In some embodiments, for example, the compartment 302 receives the pressurized fluid from an external pressurized fluid source, such as a pressurized fluid vented from another tank.

At block S402, the pressure relief apparatus 300 is fluidly connected to the tank 100, such that the inlet port 202 of the pressure relief apparatus is in fluid communication with the contents of the tank 100, and that an outlet port of the tank 100 is fluidly communicating to the inlet port 202. The closure member 208 of the pressure relief apparatus 300 is disposed in the closed position, so the contents of the tank 100 are not vented out through the outlet port 204 of the pressure relief apparatus. Further, the trigger mechanism 210 and the retainer 210B, are cooperatively configured to retain the closure member 208 in the closed position and to prevent the closure member 208 from being disposed in the open position due to the force from the contents of the tank 100.

At block S404, the compartment 302 of the pressure relief apparatus 300 is pressurized with a pressurized fluid from a pressurized fluid source. The pressurized fluid is directed past the closure member 208, the retainer 210B, and the ball 210BB into the compartment 302 by the vent gas conduit 306. Where the vent gas conduit 306 is an internal component of the pressure relief apparatus 300, as depicted in FIG. 3A, the vent gas conduit fluidly communicates the compartment 302 and the outlet port 204, and the pressurized fluid is directed into the compartment 302 through the outlet port 204 and through the body 201 of the pressure relief apparatus 300. Where the vent gas conduit 306 is an external component of the pressure relief apparatus 300, the pressurized fluid is directed into the compartment 302 without flowing through the outlet port 204, or a portion of the flow path of the pressurized fluid to the compartment 302 is outside the body 201 of the pressure relief apparatus 300.

In some embodiments, for example, the pressurized fluid is from an external pressurized fluid source, such as pressurized air or vented contents from another pressure relief apparatus, that has been triggered to release its closure member 208 and vent the contents of the tank to which this other pressure relief apparatus is attached. For example, the pressurized fluid is pressurized air generated upon venting of another pressure relief apparatus in fluid communication with the pressure relief apparatus 300 cooperatively configured into the vent system 310 as depicted in FIG. 5 and described herein. The pressure relief apparatus 300 receives the pressurized fluid through its outlet port 204. Where the pressure relief apparatus 300 is configured as part of the vent system 310, the vent tube 312 directs the pressurized fluid through the outlet port 204, and the vent gas conduit 306 directs the pressurized fluid into the compartment 302 of the pressure relief apparatus 300.

At block S406, the compartment 302 is pressurized by the pressurized fluid at or above the predetermined pressure threshold. When the compartment 302 is pressurized by the pressurized fluid at or above a predetermined pressure threshold, there is a sufficient force applied to the housing 218 of the moveable portion 2108 from the compartment 302 to overcome the forces applied to the housing 218 that urges the housing 218 away from the fixedly coupled portion 210D (e.g. the forces applied to the housing 218 by the biasing member 216 positioned as depicted in FIG. 3A, and by fluid in the portion of the actuator-receiving passage 211 on the side of the housing 218 that opposes the compartment 302) to actuate the trigger mechanism 210.

At block S408, when the force applied to the housing 218 from the pressurized fluid in the compartment 302 overcomes the forces applied to the housing 218 that urges the housing 218 away from the fixedly coupled portion 210D, the trigger mechanism 210 is disposed from a non-actuating position to an actuating position. That is, the trigger mechanism 210 is disposed from a non-actuating position to an actuating position in response to pressurization of the compartment 302 to a pressure at or above a predetermined pressure threshold.

At block S410, with the trigger mechanism 210 in the actuating position, the retainer 210B is displaceable, in response to the compartment 302 becoming pressurized at a pressure at or above a predetermined pressure threshold, such that the closure member 208 becomes released from retention by the retainer 210B and becomes displaceable from the closed position to the open position in response to urging by the contents within the tank 100.

At block S412, the closure member 208 is displaceable from the closed position to the open position in response to a sufficient pressure differential being provided between the inlet port 202 and the outlet port 204 (i.e. while the trigger mechanism 210 is disposed in the actuated position, the closure member 208 is displaced from the closed position to the open position when the pressure differential between the inlet port 202 and the outlet port 204 exceeds a predetermined minimum pressure differential). In some of these embodiments, for example, the inlet port 202 is disposed in fluid communication with the tank 100, and is, thereby, exposed to fluid pressure within the tank 100, and the outlet port 204 is disposed in fluid communication with the atmosphere and is, thereby, exposed to atmospheric pressure, such that, so long as the fluid pressure within the tank 100 exceeds atmospheric pressure by a predetermined minimum threshold, and so long as the trigger mechanism 210 is disposed in the actuated position, the closure member 208 will become displaced from the closed position to the open position. When the closure member 208 is displaced from the closed position to the open position, fluid communication is established between the inlet port 202 and the outlet 204, and the contents of the tank 100 are vented out through the outlet port 204.

In some embodiments, for example, when the contents of the tank 100 are vented out through the outlet port 204, the contents are vented to the atmosphere. In other embodiments, for example, where the contents of the tank pose a safety hazard, a health hazard, an environmental hazard, or the like, the contents of the tank 100 are directed to an appropriate venting area or processing equipment using piping, hoses, and other pressurized fluid transporting devices that are appropriate for the particular contents of the tank 100. Where the pressure relief apparatus 300 is configured as part of the vent system 310 as depicted in FIG. 5, the contents that are by the pressure relief apparatuses 300 that were triggered are vented through the vent tubes 312 and through the common vent 314.

In some embodiments, for example, the pressure relief apparatus 300 comprises the temperature responsive portion 210A that triggers the pressure relief apparatus 300 upon detection of a temperature at or above a predetermined temperature threshold to release the closure member 208 to vent the tank 100 to which the pressure relief apparatus 300 is attached. The pressure relief apparatus 300 also comprises the compartment 302 that triggers the pressure relief apparatus 300 upon detection of a pressure at or above a predetermined pressure threshold to release the closure member 208, to vent the tank 100 to which the pressure relief apparatus 300 is attached. The pressure relief apparatus 300 is configured to be vented upon detection of two types of relief conditions, namely temperature and pressure, which provides flexibility and increases the number of scenarios in which the pressure relief apparatus 300 is usable. For example, the pressure relief apparatus 300 is usable to vent the tank 100 if the tank is exposed to high pressure, high temperature, or both. The pressure relief apparatus 300 is also usable if the tank 100 is exposed to high pressure or high temperature, but not at the same instance.

In some embodiments, for example, as depicted in FIG. 5, the vent system 310 comprising two or more pressure relief apparatuses 300 is used to vent a multi-tank system. One of the pressure relief apparatuses 300 is triggered by other pressure relief apparatuses 300 in the same vent system 310. When configured into the vent system 310, the vented contents from one pressure relief apparatus 300 increases the pressure in the vent system 310 and triggers at least one of the other pressure relief apparatuses 300 in the vent system 310 to release its closure member 208 and vent the contents of the tank 100 to which it is connected. That is, for a multi-tank system configured with the vent system 310, the venting of one tank in the multi-tank system causes the other tanks in the multi-tank system to vent.

The vent system 310 protects the tanks in a pressurized system, such as a multi-tank system, from undesirable external elements, such as a fire. The fire, for example, only affects one tank 100 in the multi-tank system, or affects only one tank 100 for an extended period of time before affecting the other tanks in the multi-tank system. In these scenarios, the pressure relief apparatus 300 configured as part of the vent system 310 that is installed on the one tank 100 detects the temperature of the fire being at or above the predetermined temperature threshold and release the closure member 208 and vent the tank 100. However, in some embodiments, for example, the pressure relief apparatuses 300 installed on the other tanks do not detect the fire. Yet, the fire still presents a safety hazard even if exposed to just one of the tanks in the multi-tank system. In some multi-tank systems, the tanks in the multi-tank system are interconnected, such that the contents from the other tanks flow into the tank 100 affected by the fire, effectively refilling the tank 100 while the pressure relief apparatus 300 vents its contents. This increases the amount of time required to vent the affected tank 100. Further, the unaffected tanks may refill the affected tank 100 at a rate greater than the rate that the tank 100 is being vented. However, since the pressure relief apparatus 300 installed on the tank 100 is configured with the other pressure relief apparatuses in the multi-tank system as part of the vent system 310, the other pressure relief apparatuses detect the pressure increase in the vent system 310 as the pressure relief apparatus 300 vents the contents of the tank 100, and the other pressure relief apparatuses vent the other tanks in the multi-tank system. The vent system 310 vents the contents in the multi-tank system and mitigates the hazard presented by the fire, even if the fire affects only a portion of the multi-tank system.

In some embodiments, for example, the pressure relief apparatus 300 as depicted in FIG. 3A and the vent system 310 as depicted in FIG. 5 are installed on various configurations of pressurized systems, such as an individual tank or a multi-tank system. In some embodiments, for example, one pressure relief apparatus 300 is installed on a relatively small tank, such as a compressed natural gas tank in an automobile such as a truck or bus, or a relatively large tank such as a tank in a tank farm. In some embodiments, for example, the vent system 310 is installed in a pressurized system such as a multi-tank system comprising a plurality of compressed natural gas tanks in an automobile such as a truck or bus, or a plurality of tanks in a tank farm. In some embodiments, for example, the vent gas system 310 is also installed in a single tank, where the pressure relief apparatuses 300 of the vent gas system 310 are installed at various positions on the single tank. When a plurality of pressure relief apparatuses 300 are installed on a single tank, it increases the range for which the relief condition, such as a temperature at or above a predetermined temperature threshold or a pressure at or above a predetermined pressure threshold, is detected by the pressure relief apparatuses 300.

In some embodiments, for example, the pressure relief apparatus 300 and the vent system 310 are configured to vent the tanks 100 to which they are attached while mitigating leaks, and do not use more pressurized conduits than needed. For example, the vent gas conduit 306 is an internal component of the pressure relief apparatus 300, so additional hoses, pipes, and other appropriate conduits are not required for directing the pressurized fluid into the compartment 302. As another example, the pressure relief apparatuses 300 of the vent system 310 is fluidly connected to each other at their respective outlets 204 using the vent tubes 312. One of the pressure relief apparatuses 300 of the vent system 310 triggers the other pressure relief apparatuses 300 in a multi-tank system without having permanent pressurized connections between the tanks 100 themselves, which otherwise presents a risk of leaks.

The preceding discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only. The invention is defined by the appended claims.

What is claimed is:

1. A pressure relief apparatus for venting a tank comprising:
    an inlet port;
    an outlet port;
    a closure member retained, relative to the inlet and outlet ports, for preventing, or substantially preventing, fluid communication between the inlet port and the outlet port;
    a trigger mechanism including a temperature responsive portion;
    a compartment for receiving pressurized fluid from the outlet port and communicating the received pressurized fluid to the trigger mechanism;
    wherein:
    the trigger mechanism and the closure member are cooperatively configured such that the closure member becomes released from retention and moveable for effecting establishment of fluid communication between the inlet port and the outlet port in response to receiving of heat energy by the temperature responsive portion; and
    the trigger mechanism, the closure member, and the compartment are cooperatively configured such that the closure member becomes released from retention and moveable for effecting establishment of fluid communication between the inlet port and the outlet port in response to the communication of the pressurized fluid to the trigger mechanism via the compartment.

2. The pressure relief apparatus of claim 1, wherein:
    the trigger mechanism comprises a retainer for effecting retention of the closure member for preventing, or substantially preventing, fluid communication between the inlet port and the outlet port.

3. The pressure relief apparatus of claim 1, comprising a body that defines the compartment, and wherein the trigger mechanism is sea lingly engaged to the body such that the pressurized fluid is prevented, or substantially prevented, from being conducted past the trigger mechanism.

4. The pressure relief apparatus of claim 3, wherein:
    the trigger mechanism is disposed relative to the compartment such that the pressurized fluid received within the compartment is prevented, or substantially prevented, from being conducted past the trigger mechanism such that movement of the trigger mechanism is effectable by the pressurized fluid for effecting the release of retention of the closure member.

5. The pressure relief apparatus of claim 1, comprising a vent gas conduit configured to effect fluid communication between the outlet port and the compartment.

6. The pressure relief apparatus of claim 5, wherein:
    the compartment is disposed for being pressurized by a pressurized fluid from an external pressurized fluid source, the pressurized fluid flowing through the outlet port and directed into the compartment by the vent gas conduit.

7. The pressure relief apparatus of claim 1, wherein:
the temperature responsive portion includes a shape memory alloy.

8. The pressure relief apparatus of claim 1, wherein:
the temperature responsive portion comprises a predetermined temperature threshold, and the trigger mechanism is configured to release the closure member when the temperature responsive portion has a temperature at or above the predetermined temperature threshold.

9. The pressure relief apparatus of claim 8, wherein:
the temperature responsive portion includes a wire made with the shape memory alloy.

10. The pressure relief apparatus of claim 9, wherein:
when the wire has a temperature at or above the predetermined temperature threshold, the wire reduces in length along a longitudinal axis of the wire.

11. A method of controlling pressure in a tank comprising:
communicating fluid pressure, from an external pressurized fluid source, to an outlet of a pressure relief apparatus of a tank, such that, in response, the pressure relief apparatus becomes open, with effect that the tank becomes disposed in fluid communication with the outlet.

12. The method of claim 11, wherein further comprising:
the pressure relief apparatus includes a tank communication port for effecting fluid communication between the tank and the outlet.

13. A vent system for controlling pressure of a pressurized system, the pressurized system comprising a first tank and a second tank, the vent system comprising:
the first tank in fluid communication with a first relief apparatus, the first relief apparatus comprising an inlet port and an outlet port;
the second tank in fluid communication with a second relief apparatus, the second relief apparatus comprising an inlet port and an outlet port;
the outlet port of the first relief apparatus in fluid communication with the outlet port of the second relief apparatus;
wherein the second relief apparatus is configured to be triggered for venting the second tank in response to receiving gaseous material vented from the first tank.

14. The vent system of claim 13, wherein:
a vent tube effects fluid communication between the outlet port of the first relief apparatus and the outlet port of the second relief apparatus.

15. The vent system of claim 13, wherein:
the second relief apparatus is a pressure relief apparatus, the pressure relief apparatus comprising:
a closure member retained, relative to the inlet and outlet ports, for preventing, or substantially preventing, fluid communication between the inlet port and the outlet port;
a trigger mechanism including a temperature response portion;
a compartment for receiving pressurized fluid from the outlet port and communicating the received pressurized fluid to the trigger mechanism;
wherein:

the trigger mechanism and the closure member are cooperatively configured such that the closure member becomes released from retention and moveable for effecting establishment of fluid communication between the inlet port and the outlet port in response to receiving of heat energy by the temperature responsive portion; and
the trigger mechanism, the closure member, and the compartment are cooperatively configured such that the closure member becomes released from retention and moveable for effecting establishment of fluid communication between the inlet port and the outlet port in response to the communication of the pressurized fluid to the trigger mechanism via the compartment.

16. The vent system of claim 15, wherein:
the first relief apparatus is a first pressure relief apparatus, and the second relief apparatus is a second pressure relief apparatus.

17. The vent system of claim 15, wherein:
the trigger mechanism of the pressure relief apparatus comprises a retainer for effecting retention of the closure member for preventing, or substantially preventing, fluid communication between the inlet port and the outlet port.

18. The vent system of claim 15, wherein:
the pressure relief apparatus comprises a body that defines the compartment, and wherein the trigger mechanism is sealingly engaged to the body such that the pressurized fluid is prevented, or substantially prevented, from being conducted past the trigger mechanism.

19. The vent system of claim 15, wherein:
the trigger mechanism of the pressure relief apparatus is disposed relative to the compartment such that the pressurized fluid received within the compartment is prevented, or substantially prevented, from being conducted past the trigger mechanism such that the trigger mechanism is effectable by the pressurized fluid for effecting the release of retention of the closure member.

20. The vent system of claim 15, wherein:
the pressure relief apparatus comprises a vent gas conduit configured to effect fluid communication between the outlet port and the compartment.

21. The vent system of claim 15, wherein:
the compartment of the pressure relief apparatus is disposed for being pressurized by pressurized fluid vented from the second tank, the pressurized fluid flowing through the outlet port of the pressure relief apparatus and directed into the compartment by the vent gas conduit.

22. The vent system of claim 15, wherein:
the temperature responsive portion of the pressure relief apparatus includes a shape memory alloy.

23. The vent system of claim 22, wherein:
the temperature responsive portion comprises a predetermined temperature threshold, and the trigger mechanism is configured to release the closure member when the temperature responsive portion has a temperature at or above than the predetermined temperature threshold.

* * * * *